United States Patent [19]

Shikinami et al.

[11] Patent Number: 4,855,077
[45] Date of Patent: Aug. 8, 1989

[54] STICKING AGENT OF IONIC-CONDUCTIVE POLYMER

[75] Inventors: Yasuo Shikinami; Kunihiro Hata; Yutaka Ohmura, all of Osaka, Japan

[73] Assignee: Takiron Co., Ltd., Osaka, Japan

[21] Appl. No.: 183,962

[22] Filed: Apr. 20, 1988

[51] Int. Cl.[4] ............................................... H01B 1/06
[52] U.S. Cl. .................................... 252/518; 252/500; 252/519; 524/401; 528/57
[58] Field of Search ........................ 252/500, 518, 519; 528/57; 524/80, 401

[56] References Cited

U.S. PATENT DOCUMENTS 3,841,312 10/1974 Corasanti ........................ 128/2.06 E
3,964,477  6/1976 Ellis et al. ........................... 128/172.1
4,029,086  6/1977 Corasanti ........................ 128/2.06 E
4,125,110 11/1978 Hymes ............................ 128/2.06 E

OTHER PUBLICATIONS

Wright, P. V. et al, Brit. Polymer J., 7:319–327 (1975).

Primary Examiner—Josephine Barr
Attorney, Agent, or Firm—Sughrue, Mion, Zinn, Macpeak & Seas

[57] ABSTRACT

An ionic conductive polymeric sticking agent comprising: (a) a reaction product of (i) a polyurethanepolyol prepolymer having an alkylene oxide chain and/or a polyol having an alkylene oxide and (ii) a polyurethane polyisocyanate prepolymer having an alkylene oxide chain, and (b) an ionic compound.

8 Claims, No Drawings

STICKING AGENT OF IONIC-CONDUCTIVE POLYMER

FIELD OF THE INVENTION

This invention relates to a conductive polymeric sticking agent (or pressure-sensitive adhesive), which is a polymer which has a high ionic conduction in an amorphous solid state, that is, a polymer electrolyte having a high ionic conduction. More particularly, the invention relates to a sticking agent composed of segmented polyurethane having polyethylene oxide (PEO), polypropylene oxide (PPO), etc., in the segments thereof and having a high ionic conduction by a complex formed by the segment and an ionic compound.

The main uses of the sticking agent of this invention are as follows.

That is, the sticking agent of this invention is suitably used for conductive sticking portions of biological electrodes, i.e., electrodes for electrocardiographs (ECG), electroencephalographs (EEG), and electroculographs for biological research, diagnosis, or medical treatment as well as electrodes such as a counter electrode of an electric surgical knife and conductors for low frequency medical treatment instruments by utilizing the safety, stability, good form-keeping property, and sticking characteristics suitable for the living body, and the high electric conductivity of the sticking agent.

Also, the sticking agent of this invention can be used as a sticking agent for sticking tapes having an antistatic and semiconductive sticking layer in the fields of industry, agriculture, packaging, and electronics.

Furthermore, the sticking agent of this invention can be further used as an organic conductive binder for fine granular semiconductors or electric conductors by utilizing the features thereof, such as the sticking property and the conductive property (and transparency). The sticking agent can be also used in various fields expecting the development of organic polymer ionic conductors, such as cell diaphragms, applicators for electric double layer capacity, sensors, display elements, electrolyte applicators, etc.

BACKGROUND OF THE INVENTION

Background of Conductive Material by Ionic Conduction

One of the ultimate objects of the research and development of electronically conductive polymeric materials is to produce "a material which has light weight, has an electric conductivity like metals, is stable, and can be easily processed or fabricated".

In general, a method of imparting an electric conductivity to a polymeric material is classified into (1) a method of structurally designing at the molecular level, such as (A) the provision of electronic conduction and (B) the provision of ionic conduction, (2) a method by metallizing, such as (A) chemical plating, (B) vapor deposition, and (C) the utilization of polymer-metal salt complexes, and (3) a method by blending metal fibers or powders with a polymer.

In regard to conductive polymers such as polyacetylene, polypyrrole, polythiophene, polyaniline, etc., belonging to the polymeric materials by method (1)-(A) described above, various goals such as (a) high electronic conduction (b) form-keeping property, (c) mechanical strength as a practically usable material, (d) safety and stability, and (e) cost and economy have not yet been achieved.

On the other hand, electrically conductive materials by the ionic conduction in method (1)-(B) described above have recently been developed for practical uses, such as batteries, etc., by using the concept of polymer aggregates and polyelectrolytes since P. V. Wright et al. in 1975 reported that a complex of polyether and an alkali metal showed electric conductivity.

However, the aforesaid development has not yet been practiced in industry. On the other hand, the present invention provides a practically usable polymeric material having a good ionic conduction by molecularly designing an ionic-conductive material into a polymeric sticking material.

Morphological Explanation of Ion-Conductive Polymers

It has been clarified at present that the ionic migration in a polymeric ionic conductor (polymer electrolyte) occurs in the amorphous phase which is in a rubbery state of the polymer aggregate. Accordingly, the main theme in the case of designing ion-conductive polymers is the manner of inserting a metal ion (e.g., forming a polymer-metal salt complex) into the aggregate of the molecule in the amorphous phase thereby forming a hybrid.

In order for such a molecularly designed polymer to become a practically usable material, the polymer must have, as a matter of course, properties fitting to such a material, such as mechanical strength, chemical properties, heat resistance, water resistance, etc.

The glass transition temperature (Tg) of a liquid polymer such as polyethylene oxide (PEO) or polypropylene oxide (PPO) having a relatively low molecular weight is lower than room temperature and the amorphous phase thereof is in a rubbery state at about room temperature, which dissolves an electrolyte relatively well. Accordingly, such a polymer is suitable for obtaining a high ionic conduction by forming a hybrid with an ion. In particular, PEO is convenient for obtaining an electronic conductor having a high ionic conduction caused by the conformation of the molecule.

PEO itself, however, has a low mechanical strength and low melting point, and PEO in the molten state is a fluid material having a low viscosity and is easily dissolved in water. On the other hand, PPO is a liquid even when the molecular weight thereof is high. Therefore, PEO and PPO each is lacking in desired properties as practically usable materials in various fields by themselves.

Accordingly, it has hitherto been attempted to obtain a material having a high ionic conduction by introducing PEO or PPO into the side chain or main chain of other polymers to reduce the Tg of the mother polymer and form a complex of the PEO chain or PPO chain and ions. For example, there is a phosphazene polymer, a methacrylate series polymer, polysiloxane, etc., each having the PEO chain at the side chain thereof.

Also, attempts have been made to try to obtain practically usable materials by the network of PEO or PPO using various crosslinking agents or by copolymerizing PEO or PPO with a crystalline polymer.

However, even in this case, the reduction of the ion dissociation degree of the polymer frequently occurs and reduces the ionic conductivity i.e., the electric conductivity. Also, a phase separation from the segment having an ionic dissociating faculty frequently occurs, whereby it becomes difficult to obtain a practically usable material.

This invention has been made based on the aforesaid fact that if a polymer has an amorphous phase in a rubbery state having an ionic dissociating faculty in the molecule thereof, a high ionic conduction is obtained. That is, the invention provides an electronically conductive material having a high ionic conduction by imparting an ionic conduction to a polymeric sticking material which is a polymer aggregate almost completely or completely composed of an amorphous phase in a rubbery state and also to provide various uses of the conductive polymeric sticking agents having a high ionic conduction.

Definition of Sticking Agent

It is generally difficult to scientifically define the sticking property which is the essential quality of a sticking agent. A sticking agent is also called a "pressure-sensitive adhesive" and can be generally defined as "an adhesive which can stick to other surfaces by a very weak force such as light finger pressure without needing any activating action of water, solvent, heat, etc., and it can be easily released, in the case of releasing, from the surface without staining the surface".

A sticking agent may be a kind of adhesive but is largely different from an adhesive in the aspect that the sticking agent can sufficiently stick by a simple pressing manner only and can be easily released, if desired. Accordingly, a sticking agent has a low cohesive force and show a quick stress relaxation as compared with an adhesive and must easily cause flowing by an external force. Therefore, the behavior thereof has elasticity. Also, the characteristics of a sticking agent are composed of three sticking factors, i.e., a sticking force (sticking to other materials), a retentive power (fluidity of sticking agent), and tack (wetting property for other materials).

Background of Sticking Agents

In general, the behavior of a sticking agent is elastic and is based on fluidity. Accordingly, the composition of a sticking agent is mainly composed of an elastic polymer and a tackifier (softener).

As an elastic polymer giving low cohesive force, there are (a) a dienic elastomer, (b) an ethylenic elastomer, and (c) a condensation elastomer.

Examples of the dienic elastic body (a) are natural rubber, styrene-butadiene rubber (SBR), polyisoprene, polyisobutylene, butyl rubber, styrene-isoprene-styrene rubber (SIS), and styrene-butadiene-styrene rubber (SBS).

Also, a typical example of the ethylenic elastomer (b) is an acrylic polymer.

An acryl polymer which is a base of an acrylic sticking agent has the feature that the polymer shows a sticking property by itself and does not need a tackifier. The monomers constituting the polymer are composed of a sticking component (a suitable example thereof is an alkyl acrylate having an alkyl group of from 4 to 10 carbon atoms and the ·Tg of the polymer composed thereof is from about $-20°$ C. to $70°$ C.), an aggregating component (e.g., an alkyl methacrylate having a lower alkyl, and vinyl acetate, which serves to increase the aggregating property and, sometimes, to improve the sticking property, the water resistance, and the transparency of the polymer), and a property improving component (e.g., a carboxylic acid such as acrylic acid, etc., a monomer having a hydroxy group, and an acid amide, which takes part, as the case may be, in the crosslinkage of the polymer and is useful for the increase of the aggregating property and sticking property).

Also, a typical example of the condensate series elastomer (c) is a silicone series elastomer such as rubbery siloxane and resinous siloxane.

On the other hand, as the tackifier, (a) a sticking property imparting resin (a resin capable of giving a sticking power or tack, such as rosin, a coumarone-indene resin, polyterpene, etc., which are generally solids), (b) a plasticizer (e.g., polyester, silicone, etc., for increasing softness, elasticity, and flexibility of the polymer) and, as the case may be, (c) fats and oils, (d) lower polymers, (e) crosslinking agents, (f) sticking property improving agents, (g) fillers, etc., are used.

In any case, a sticking agent is a polymeric compound having a viscoelasticity and fluidity, i.e., an amorphous phase aggregate almost all or completely all of which is in a rubbery state.

On the other hand, the polymeric compound of this invention is polyurethane having polyalkylene oxide such as PEO and PPO in the segment wherein the glass transition temperature (Tg) thereof is lower than room temperature and the amorphous phase thereof is in rubbery state at about room temperature. Accordingly, since the polymer of this invention is an amorphous phase aggregate almost all or completely all of which is in a rubbery state (liquid state), the polymer can become a material being rich in sticking property. Furthermore, the extent of the sticking property thereof can be desirably controlled by changing the ratio of the liquid phase and the solid phase in the amorphous phase by the selection of the segment. The sticking agent, the extent of the sticking property of which can be desirably controlled by changing the segments thereof as described above, is different from the aforesaid conventional sticking agent which is composed of a mixture of compounds each having each function and is a new sticking agent so molecularly defined that each function is mainly allotted to each segment in the molecule.

Background of Conductive Sticking Agents

A sticking agent can be used alone but is usually used as a sticking product obtained by coating it on another element (e.g., a paper, a cloth, or a plastic film). Also, the uses thereof are in many fields of industry, electric devices and instruments, agriculture, construction, medical treatment, packaging materials, office supplies, household furnishings, etc.

As will be understood from the components constituting a conventional sticking agent, when the sticking agent is coated on cellophane or a plastic tape, it is strongly statically charged and hence in the case of producing such sticking tape or unwinding the tape, various problems occur due to static electricity. Also, recently, with the rapid progress being made in the electronics industry, the need for conductive or semiconductive adhesives or sticking agents has greatly increased. As a quick solution for the need, a method of mixing a conventional sticking agent with an antistatic agent or fine fibers or powder of a metal or carbon has been employed at present.

However, in this method, a large amount of conductive material is required and, in particular, it is technically difficult to completely uniformly disperse the fine fibers or powder of a metal, etc., which results in forming dead spaces in conductive portions. Also, in the case of antistatic agents, even if a large amount thereof is used, sufficient antistatic effects and semiconductivity are not obtained.

On the other hand, in the sticking agent of this invention imparted with an ionic conduction, wherein the ether oxygen of the alkylene oxide thereof and an alkali metal ion form a hybrid (i.e., a form wherein the metal ions are molecularly dispersed in the polymer segments), an electric conductivity is effectively obtained in a state where the smallest amount of the ions which are a conduction imparting material are uniformly molecularly dispersed. Accordingly, no dead space in conductive portions by inferior dispersion occurs. In such a molecularly dispersed state, when the segment polyurethane sticking agent of this invention is transparent, the sticking agent imparted with an ionic conduction is also transparent. Thus, this invention provides a transparent conductive polymeric sticking agent which has not previously existed.

Also, since the sticking material of this invention is formed by reacting a polyol having an alkylene oxide chain and a polyurethane isocyanate prepolymer having an alkylene oxide chain, the sticking material in a gel state can be obtained and also a conductive gel having sticking properties can be obtained. In this case, since the gel can be handled as a sheet-form, block-form, or a bulk-form material, various uses of gel products can be developed. That is, a wide range of uses as solid electrolytes having sticking properties are possible.

Background and Uses of Sticking Agents of the Invention

One of the uses of an ionic conductive sticking agent is for conductive sticking portions of electrodes for the living body. That is, there are dry electrodes for living body diagnosis or for measuring electrocardiograms (ECG), electroencephalograms (EEG), electrooculograms, electromyograms (EMG), electrodermograms (EDG), etc., for living body treatment, conductors for transcutaneous electrical nerve stimulation, electrodes for a counter electrode of electric surgical knives, etc.

Hitherto, various materials as described above have been used for the aforesaid uses or investigated for uses but there are various problems.

For example, for a conductive sticking agent which is considered to be one of ionic conductive polymeric sticking agents, it has been attempted to impart an electric conduction to a proper sticking agent by mixing therewith a metal powder, carbon fibers, metal fibers, a carbon powder (Japanese Utility Model Publication No. 17977/65), and various metal salts. However, in such a method, it is required to considerably increase the mixing ratio of a conductive solid, which inevitably changes the properties of the sticking agent itself. Also, in such a case, dead spaces in conductive portions are formed by nonuniform mixing.

Also, it may be considered that a sticking agent may be formed by dissolving a metal salt in a hydrogel of a high water absorbing and hygroscopic resin (e.g., an acrylic acid (salt) grafted starch, a vinyl alcohol-acrylic acid (salt) block copolymer, a crosslinked acrylic acid (salt) and a modified polyvinyl alcohol). However, since in such a sticking agent, the sticking property is insufficient and also the sticking property is lost by evaporation of water by drying, the sticking agent is unsuitable for practical use.

Furthermore, it has been attempted to impart an electric conduction to a polyhydroxyethyl methacrylate (HEMA) series polymer by impregnating the polymer with water and mixing it with a metal ion. However, such an acrylic polymer is generally obtained by the polymerization of monomer(s) and when the sticking agent is for the living body, the remaining monomer(s) cause toxic problems. Also, in the case of forming a composite product having the sticking layer, when the monomer(s) are polymerized on a cloth, a formed sheet, a plastic film, etc., a problem arises in that these base materials are corroded by the monomer(s).

Now, at the beginning of the development of living body electrodes, a thin plate of a highly electrically conductive metal such as aluminum, gold, silver, platinum, copper, etc., was used. However, since such a thin metal does not closely contact with skin, it is necessary to employ a method of fixing the thin plate by a sticking tape. However, even in such a manner, the contact of the thin plate and the skin is unstable and the thin plate is liable to easily separate and impart noise to the electric signals, whereby data having high reliability are not obtained.

As an alternative, there is a method of coating a skin with a sol-like material such as a conductive jelly, cream or paste to improve the contact of the skin and an electrode material and further fixing the electrode by means of surgical tape, etc., for preventing the electrode from falling off. In this case, however, when such a sol-like material is used, inferior contact of the electrode can be caused by heat and sweat from the skin and if the removal of the sol-like material after use is insufficient, an unsanitary problem occurs.

Thus, a dry living body electrode without need of coating such a conductive jelly, etc., that is a living body electrode having a support supporting an Agcl-Ag series electrode connector having a conductive sticking agent layer on the back surface of the support was proposed as described in U.S. Pat. No. 3,964,477.

As such a conductive sticking agent, there is a material formed by impregnating a form such as a polyurethane foam with a conductive liquid compound (e.g., glycerol, an aqueous sodium chloride solution, carboxymethyl cellulose, ethyl paraoxybenzoate, water, etc.) to enable the detection of electric signals from skin (e.g., U.S. Pat. Nos. 3,841,312 and 4,029,086). However, since in the case of using such a sticking agent, the conductive portion is composed of a foam simply containing an electrolyte sol containing water, there are problems that the stuck portion loses electronic conduction by drying, it gives a stimulus feeling to the skin, and there is difficulty in achieving close contact of the conductive portion and the skin.

Also, a living body electrode composed of a support having laminated thereon a metal such as aluminum and having a conductive sticking agent layer formed on the surface of the support is described in U.S. Pat. No. 4,125,110. However, such an electrode is not pliable enough so that the thin metal plate cannot follow the skin, which results in peeling off of the plate and irritating the skin by rubbing of the skin with the end portion of the electrode.

Moreover, a natural polymeric polysaccharide gum such as karaya gum containing a polyhydric alcohol, fine particles of salt, fine particles of metal, etc., for imparting close contact properties and adhesive properties has been proposed (Japanese Utility Model Publication No. 25681/81). However, since natural saccharide is used, the quality differs according to the place for producing the saccharide and quality control is difficult. Also, since the conductor depends on an electrolyte using water as the medium, the properties thereof greatly differ with the content of water. For example, when the amount of sweat from skin is large during, for example, summer, the material is frequently deformed by causing swelling or fluidity. Also, since in dry seasons, the electronic conduction is lost by the evaporation of water, strict packing or storage of the material is required. Furthermore, since during storage of the material for a long period of time, the material is discolored by the action of the natural polymeric polysaccharide and blend(s) and the growth of fungi occurs, there is a problem in that it is undesirable to use such a material in contact with a human body.

SUMMARY OF THE INVENTION

An object of this invention is, therefore, to provide a conductive polymeric sticking agent which has a good electric conduction by ionic migration and can be stably used for various electric uses for a long period of time.

Another object of this invention is to provide an ionic conductive polymeric sticking agent having excellent sticking characteristics, which are freely adjusted, such as sticking power, retention power, tack, etc., by designing the molecular structure.

Another object of this invention is to provide a polymeric sticking agent which can be suitably used for conductive sticking portions of living body electrodes by utilizing the features thereof that when the sticking agent is applied to skin of a human body, the sticking agent can contact well with the skin and follow the movement of the skin without showing any resistance, the sticking agent gives good contact feeling, and the sticking agent exhibits almost no unpleasant feeling upon sweating.

It has now been discovered that the aforesaid objects can be attained by an ionic conductive polymeric sticking agent comprising alkylene oxide segmented polyurethane containing an ionic compound, the polyurethane being obtained from the reaction of: (i) a polyurethanepolyol prepolymer having an alkylene oxide chain and/or a polyol having an alkylene oxide chain and (ii) a polyurethane polyisocyanate prepolymer having an alkylene oxide chain.

The sticking agent of this invention can be used for conductive sticking portions in various fields of arts.

DETAILED DESCRIPTION OF THE INVENTION

The polyurethanepolyol prepolymer for use in this invention is illustrated by the following formula (I) and the polyol for use in this invention is illustrated by the following formulae (II) to (IV). These prepolymers and polyols can be used singly or as a mixture.

Also, the polyurethane polyisocyanate prepolymer for use in this invention is illustrated by the following formulae (V-1) to (VIII) and these can be used singly or as a mixture.

Each of these prepolymers has a group —OH or —NCO as a functional group and by the reaction of the functional group, an interpenetrated network segmented polyurethane having a sticking property is formed.

Now, the polyurethanepolyol prepolymer and the polyol represented by formulae (I) to (IV) is explained in detail.

The prepolymer represented by formula (I) shown below is a polyurethanepolyol prepolymer which is a reaction product of a polyether polyol and a diisocyanate. Each of the terminal components is composed of a polyether polyol and both termini are a hydroxy groups, —OH.

The diisocyanate compound for use in this case is the same as the diisocyanate in the prepolymer of polyurethane polyisocyanate described hereinbelow. For example, φ-phenylene diisocyanate, 2,4-tolylene diisocyanate (TDI), 4,4'-diphenylmethane diisocyanate (MDI), naphthalene 1,5-diisocyanate, hexamethylene diisocyanate (HMDI), tetramethylene diisocyanate (TMDI), lysine diisocyanate, xylylene diisocyanate (XDI), hydrogenated TDI, MDI hydride, dicyclohexyl dimethylmethane p,p'-diisocyanate, diethyl fumarate diisocyanate, isophorone diisocyanate (IPDI), etc., can be used.

The polyol shown by formula (II) described below is an adduct of glycerol (L=1) or sorbitol (l=4) and a polyether polyol.

The polyol shown by formula (III) described below is an adduct of trimethylolpropane and a polyetherpolyol. An adduct of a polyether polyol and a polyhydric alcohol such as 1,2,6-hexanetriol having the formula,

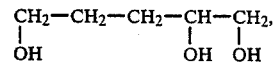

trimethylolethane having the formula,

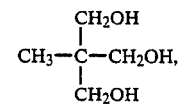

pentaerythritol having the formula $C(CH_2OH)_4$, polyglycerol having the formula,

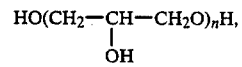

wherein n is a positive integer of from 2 to 30, and partial esters thereof can be also used as such a polyol.

In this case the alkylene oxide (AO) chain may be a homopolymer, a block copolymer, or a random copolymer.

The polyol shown by formula (IV) described below is a polyether polyol having an alkylene oxide chain and both termini can be a hydroxy group, —OH, or one of the termini can be blocked by an alkyl group, an aromatic group, etc. These polyols are readily available as commercial products.

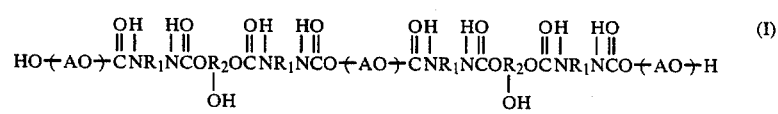

wherein $R_1$ and $R_2$ each represents an alkyl group, an alicyclic group or an aromatic group and (AO) represents an alkylene oxide chain.

$$\begin{array}{c} CH_2O-(AO)-H \\ | \\ [CHO-(AO)-H]_l \\ | \\ CH_2O-(AO)-H \end{array} \quad (II)$$

$$\begin{array}{c} CH_2O-(AO)-H \\ | \\ CH_3CH_2CCH_2O-(AO)-H \\ | \\ CH_2O-(AO)-H \end{array} \quad (III)$$

$$R_3O-(AO)-H \quad (IV)$$

In the above formulae (II) to (IV), (AO) represents an alkylene oxide chain; $R_3$ represents a hydrogen atom, an alkyl group, an alicyclic group, or an aromatic group; and l is an integer of 1 or 4.

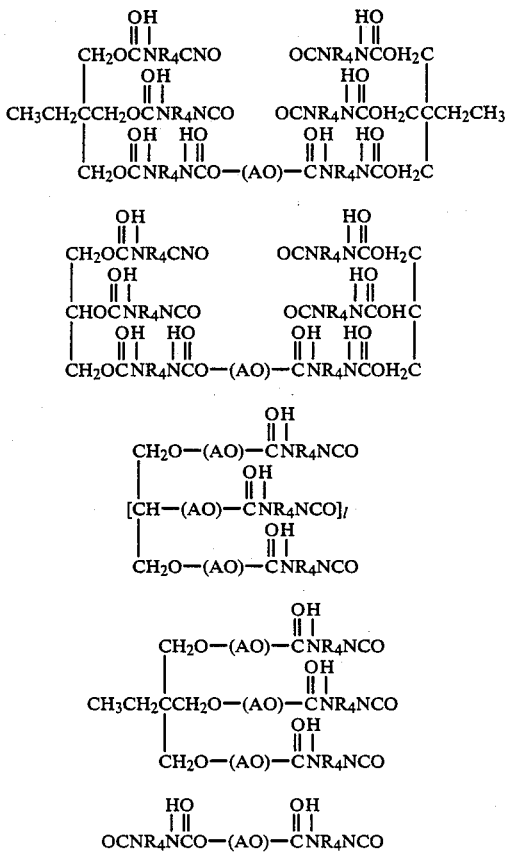

In formulae (V-1) to (VIII), $R_4$ represents an alkyl group, an alicyclic group or an aromatic group, (AO) represents an alkylene oxide chain, and l represents an integer of 1 or 4.

The polyisocyanate prepolymer for use in this invention is shown by formulae (V) to (VIII) described above.

The prepolymer shown by formula (V-1) or (V-2) described above is a tetrafunctional tetraisocyanate obtained by dimerizing two molecules of trifunctional triisocyanate with one molecule of (AO), the trifunctional triisocyanate being obtained by the reaction of trimethylolpropane or glycerol and diisocyanate. In the case of using trimethylolpropane, the prepolymer shown by formula (V-1) is obtained and in the case of using glycerol, the prepolymer shown by formula (V-2) is obtained. Since in such a tetrafunctional tetraisocyanate, the triisocyanate is liable to be dimerized with the two or three molecules of (AO), the aforesaid reaction must be delicately controlled. Accordingly, the unreacted trifunctional triisocyanate may partially exist in the prepolymer formed but when the prepolymer is reacted with a polyol, a large dispersion occurs in the distribution of the segmented polyurethane molecular weight, which sometimes acts to conveniently control the sticking property.

The prepolymer shown by formula (VI) is obtained by the reaction of the polyol shown by formula (II) and a diisocyanate.

Similarly, the prepolymer shown by formula (VII) is obtained by the reaction of the polyol shown by formula (III) and a diisocyanate and is a trifunctonal compound.

The prepolymer shown by formula (VIII) is a reaction product of a polyether polyol and a diisocyanate and is a difunctional compound.

The compounds of formulae (V-1) to (VIII) can be readily prepared by methods known in the art.

Since various alkyl groups, alicyclic groups and aromatic groups can be used as $R_1$ to $R_4$ of the present invention, it would not be necessary to specify these groups as a definition of $R_1$ to $R_4$.

As is apparent from the above description, however, it can be noted that the aliphatic group is, for example, tetramethylene, hexamethylene, etc., the aromatic group is, for example, phenylene, tolylene, diphenylmethane, naphthalene, diethyl fumarate, etc., and the alicyclic is, for example, a hydrogenated xylylene, hydrogenated tolylene, dicyclohexyl methane, isophorone, etc., as typical examples, so the invention should not be construed as being limited to these examples.

Now, the alkylene oxide chain shown by (AO) in the structures described above suitable for this invention is explained in detail.

It is preferred that an alkylene oxide chain is entirely or almost entirely a compound in the liquid state at normal temperature so that the segmented polyurethane is a sticking material at normal temperature, the segmented polyurethane is excellent in sticking characteristics such as sticking power, retentive power, tack, etc., and the hybrid of an ionic compound and the segment forms a rubbery amorphous phase having a high ionic conduction.

Examples of the compound constituting the alkylene oxide chain are polymethylene glycol, polyethylene glycol, polypropylene glycol, polytetramethylene glycol, polypentamethylene glycol, polyhexamethylene glycol, and polyheptamethylene glycol. However, from the viewpoints that the ratio of ether oxygen to the carbon number of methylene group is relatively large, the chance of forming a complex with an ionic compound is large, and the chance of obtaining a liquid material at normal temperature, polyethylene glycol, polypropylene glycol, and a polytetramethylene glycol are preferred.

Also, copolymers of these compounds such as those shown by

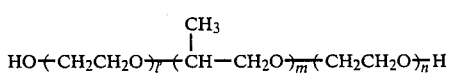

-continued and

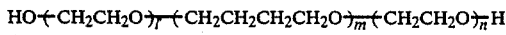

wherein l', m and n represent an integer of at least 1, can be used. These copolymers may be block copolymers or random copolymers. In this case, each segment in the prepolymer may be composed of a different alkylene oxide chain.

Since almost all or all of the alkylene oxide chain should be in the liquid state at normal temperature, the upper limit of the molecular weight is limited. In the case of polyethylene glycol, the molecular weight is from 150 to 1,000, and preferably from 300 to 800. In the case of polypropylene glycol, it is in the liquid state when the molecular weight is a few ten thousands and the usable range thereof is wide. However, if the ratio of terminal groups is small, the reaction possibility is lowered, while if the chain is too long, the sticking agent formed is rich in fluidity and poor in retentivity and thus the molecular weight of the polypropylene glycol chain is preferably from about 200 to about a few thousands. In the case of polytetramethylene glycol, if the polymerization degree is large, the chain becomes solid and hence the molecular weight of the chain is from about 300 to 3,000. Also, the copolymers of these alkylene oxides can be used in the range of a few hundreds to a few thousands in molecular weight as in the case of polypropylene glycol.

Now, it can be generally said that if the alkylene oxide chain which is the segment constituting the prepolymer of the polyol or polyisocyanate in this invention is solid at normal temperature, the prepolymer itself is solid and if the alkylene oxide chain is liquid, the prepolymer itself is liquid. This is true of the segment wherein the straight chain molecules occupy the major part of the molecular weight thereof. When both the prepolymer of polyol and the prepolymer of polyisocyanate are a viscous liquid at normal temperature, the segmented polyurethane obtained by the reaction thereof becomes a resin having a sticking property. However, when one of the segments is solid or both of the segments are in an extremely viscous liquidous state or in a semi-solid state, the segmented polyurethane obtained by the reaction thereof becomes a solid resin showing no sticking property at normal temperature, which is unsuitable in this invention. In this case, however, when all the segments are liquid, other semi-solid or solid prepolymers may be added thereto for controlling the sticking property.

On the other hand, even in the case of segments which are liquid at normal temperature, the segmented polyurethane which is the reaction product of the prepolymers formed by the segments having low molecular weight does not become a sticking agent having high sticking property. This is because in the segmented polyurethane composed of the segments only having a short segment length, the molecules of the liquid segments are restricted by the crosslinked points of the urethane bond, i.e., the network points to be restrained from freely moving. In other words, in a state having a high network chain concentration, the segmented polyurethane becomes a viscous elastic body having high elasticity even when the segments are liquid and thus becomes a sticking agent having relatively inferior sticking power and retentive power. Accordingly, it is inevitable for obtaining a sufficient sticking property that a part of or many of the segments have a proper molecular length and the length is said to be the value described above. Also, the alkylene oxide having sufficiently long chain length is effective as the "reactionable field" for forming a complex of the ether oxygen and various ionic compounds, whereby an ionic conduction is obtained.

The reaction ratio of the polyol to the polyisocyanate is explained below. Experimentally speaking, the molecular aggregate of a sticking material is required to have molecules of relatively high bulky structure having a proper molecular weight and to have a segment length capable of freely moving or many linear molecules in terminal portion. Accordingly, when each of the polyol and the polyisocyanate is a single compound, it is required that they are a combination wherein one of them is a difunctional compound and the other is a tri- or more functional compound. If one of them is a monofunctional compound, they are not polymerized. If both of them are difunctional, the reaction product becomes a straight chain molecule and if the prepolymer does not have branch, the aggregate of high bulky molecules is not obtained, which is unsuitable in this invention. That is, a combination that one of them is difunction and the other is trifunction or more, or a combination that both of them are trifunctional or more, is preferred. However, in the case of the reaction product having too large of a functional number, the network chain concentration is too high and hence if a segment having a considerably long chain does not exist, the elasticity is dominant over the sticking property, whereby a preferred sticking property is not obtained. Thus, a preferred combination for obtaining good sticking property is that the functional numbers of the polyol and the polyisocyanate are from 2 to 4 in the aforesaid range of the function number, wherein one of the components has a functional number of 3 to 4. If the functional numbers are as above, a component having one functional group can be mixed therewith for increasing the bulkiness in order to finely control the sticking property. Also, in the case of using the polyol and polyisocyanate prepolymer having a considerably long (AO) chain only, a polyfunctional polyhydric alcohol or a polyfunctional isocyanate (each having no (AO) segment) may be mixed therewith.

The prepolymer reaction ratio of the polyol to the polyisocyanate can be regulated by the ratio of the functional groups of the termini, that is, by the value of OH/NCO. If unreacted —NCO remains, a post reaction occurs and hence OH/NCO must be 1 or higher. Experimentally, good sticking agent is obtained when $1 \leq OH/NCO \leq 5$. When OH/NCO is from 1 to 5, it can be assumed that in the aggregate of bulky molecules, straight chain segments having a hydroxy group at the termini are in a state of freely moving. As the functional number gets nearer to 5, free polyol straight chain segments having a hydroxyl end group are greater. Also, the polymer molecules aggregate in the sizes suitable for giving high sticking property.

The range of the molecular weights of the polyol and the polyisocyanate constituting the sticking material of this invention differs in a wide range according to the kind of (AO) and the isocyanate, the molecular form of these two molecules, and whether (AO) is a homopolymer or a copolymer, but the molecular weight of the polyurethanepolyol prepolymer is suitably from about 1,400 to 10,000, and preferably from 1,000 to 6,000, that of the polyol is suitably from about 150 to 6,000, and preferably from about 300 to 3,000, and that of the polyurethane polyisocyanate prepolymer is from about 500 to 10,000, and preferably from 1,000 to 6,000.

Now, a dissociable ionic compound forming a complex with the ether oxygen of the polyetherpolyol forming an alkylene oxide chain in this invention to give ionic conduction is explained.

It is well known that an ether oxygen of an alkylene oxide forms a complex with $H^+$ a carboxylic acid. Also, it is well known that the ether oxygen of alkylene oxide becomes an ionic conductor by forming a complex with a metal ion such as $Li^+$. Examples of the metal salt for the metal ion are $NaCl$, $KCl$, $LiCl$, $LiClO_4$, $NH_4Cl$, $KClO_4$, $AlCl_3$, $CuCl_2$, $CuCl$, $FeCl_2$, $FeCl_3$, $NH_4SO_4$, $KNO_3$, $NaNO_3$, $Na_2CO_3$, $LiBF_4$, $NaBF_4$, $KBF_4$, $NaSCN$, $KSCN$, $LiSCN$, $NH_4SCN$, $RbSCN$, $CsSCN$, $LiSO_3CF_3$, $NaI$, $KI$, $LiI$, $NaBr$, $KBr$, $LiBr$, $CH_3COOLi$, $CF_3COOLi$, $CF_3CF_2CF_2COOLi$, sodium alginate and sodium polyacrylate. In these salts, an alkali metal salt capable of easily forming a complex with the ether oxygen of (AO) is preferably used in this invention. Also, of the alkali metal salts, a lithium salt shows a good ionic conduction. Examples of these lithium salts are $LiCl$, $LiClO_4$, $LiBF_4$ and $LiSO_3CF_3$.

Of these lithium salts, $LiClO_4$ is particularly useful for practical purposes since the salt is easily soluble in (AO) and a plasticizer and can be easily obtained. However, in the case of applying the sticking agent to the surface of skin of a living body as living electrodes, etc., the salt must be selected with a concern for safety.

Furthermore, it is one of the selective factors for the salt that the salt is dissolved in the prepolymer (mainly in the alkylene oxide therein) for being molecularly dispersed by forming a complex.

Each of these ionic compounds may be previously mixed with the polyol prepolymer and dissolved therein, which may be mixed with polyisocyanate for reaction. Also, a method may be employed wherein after reaction, the sticking agent formed is immersed in an aqueous solution or an organic solvent solution of the ionic compound and the aqueous solution or the organic solvent is removed by drying.

The compounding ratio of the ionic compound depends upon the kind and the ratio of the alkylene oxide in the segments but is, experimentally in the range of one ion for forming the complex to 5 to 30 ether oxygens. If the compounding ratio is larger than the aforesaid range, the movement of the segments is restrained by the formation of complexes to harden the sticking material formed, which results in reducing the sticking property thereof. On the other hand, if the compounding ratio is lower than the aforesaid ratio, the electric conductivity of the sticking agent formed is reduced.

Also, if necessary, a plasticizer such as dimethoxypolyether glycol (e.g., dimethoxytetramethylene glycol) may be added thereto for imparting tack. When such a material is added, the intramolecular force of the portion of the alkylene oxide chain is obstructed to easily provide a rubbery state, which results in improving the ionic conduction.

In addition, the reaction rate for the reaction of the polyol and the polyisocyanate may be controlled by the addition of a proper amount (about 0.01 to 1.0%) of dibutyltin laurate, trialkylamine, triethylenediamine, tertiary amine, etc., to the reaction system as a catalyst for the reaction.

The sticking agent of this invention as described above is an interpenetrated network polymer type segmented polyurethane having alkylene oxides in the segments. Almost all of these segments are liquid at normal temperature and have a proper length for giving sticking property. Also, the segmented polyurethane has alkylene oxide chains having —OH at the terminal groups making possible free molecular motion at the outside of the network molecule. The network polymer has a bulky structure but the molecular weight is not so large as to become a solid resin having high strength. The segmented polyurethane is considered to be in a form which the aggregate of such molecules show a sticking property. Also, the ether oxygen of the alkylene oxide causes an interaction with the cationic molecule of the aforesaid ionic compound to molecularly disperse (dissolve) the ions. When an electric potential is applied to the sticking agent having formed such a complex, the ions transfer to send an electric current. That is, the sticking agent shows an electric conduction by the ionic conduction. The electric conductivity in this case is from about $10^{-3}$ to $10^{-7} \Omega^{-1} \cdot cm^{-1}$ (the resistance is from about $10^3$ to $10^7 \Omega \cdot cm$) and the electric conductivity is considerably higher than that of other conventional electric conductive plastics.

The polyol and polyisocyanate which are the raw materials for the sticking agent of this invention are prepolymers having a relatively high molecular weight different from low molecular weight monomers and are liquid materials having high viscosity. For controlling the viscosity while handling and dissolving the ionic compound, a solvent may be used but the aforesaid materials can be used without a solvent. Accordingly, the occurrence of problems in safety by residual monomers and residual solvent in a conventional acrylic sticking agent can be avoided. This is particularly effective for the use of applying to the surface of the human body. It has been confirmed that the alkylene oxide which the constitutional molecule of the sticking agent of this invention, i.e., polyethylpolyol is generally considered very safe for application to the human body. Similarly, polyurethane having the polyetherpolyol as the segments shows high safety and has been practically used as polymeric materials for medical treatment. Also, by selecting the kind of polyetherpolyol, the balance in the hydrophilic properties and hydrophobic properties of the segment can be controlled and the flexibility of the molecule by the urethane bond is added to provide the sticking agent having high transparency, showing good close sticking property to skin, having high softness and good adaptability, and exhibiting less stimulus feeling. Accordingly, the sticking agent of this invention is suitably applied to the human body and is suitable for living body electrodes as an ionic conductor. In this case, the sticking agent of this invention becomes a novel material provided with sticking property, electric conductivity and safety as well as stability and economy as practically or industrially usable materials.

Furthermore, the sticking agent of this invention can be optionally used as composite materials by coating, if necessary, on a substrate such as a cloth, a paper, a plastic sheet, a plastic film, a foam, etc., in a state of prepolymer mixed with a polyol, polyisocyanate, an ionic compound, and other additives and heating to room temperature to about 70° C. to be cured. In this case, when the sticking agent is heated in a mold to cause the curing reaction, a transparent gel form block or molding can be easily obtained and the product can be used for various uses.

Now, the invention is further explained by the following examples.

weight of 1,000 and contained a polyfunctional polyisocyanate having a low molecular weight intermixed at the synthesis thereof. Also, in this case tetramethylene diisocyanate was used as the isocyanate.

TABLE 1

| Sample No. | PUP-OH Molecular Weight | PUP-OH Segment Constitution | PUP-OH Segment Constitution Ratio | P-OH Molecular Weight | P-OH Segment Structure | PUP-NCO Molecular Weight | Blending Ratio (weight part) PUP-OH | P-OH | PUP-NCO | Catalyst | Ionic Compound | Volume Resistivity ($\Omega \cdot$ cm) | Sticking Property | (OH)/(NCO) |
|---|---|---|---|---|---|---|---|---|---|---|---|---|---|---|
| 1 | 1,700 | E P E | 3:4:3 | 200 | E | 1,600 | 100 | 50 | 100 | 1 | 16 | $5 \times 10^6$ | ◉ | 2.94 |
| 2 | 1,900 | E P E | 4:3:4 | 200 | E | 1,600 | 100 | 50 | 100 | 1 | 16 | $3 \times 10^6$ | ◉ | 2.84 |
| 3 | 3,700 | P P P | 1:1:1 | 200 | E | 1,600 | 100 | 50 | 50 | 1 | 16 | $4 \times 10^6$ | O | 4.86 |
| 4 | 1,900 | E P E | 4:3:4 | 150 | E | 1,600 | 100 | 38.5 | 125 | 1 | 11.5 | $3 \times 10^6$ | O | 2.31 |
| 5 | 1,900 | E P E | 4:3:4 | 300 | E | 1,600 | 100 | 38.5 | 100 | 1 | 11.5 | $4 \times 10^6$ | ◉ | 1.86 |
| 6 | 1,900 | E P E | 4:3:4 | 400 | E | 1,600 | 100 | 38.5 | 60 | 1 | 11.5 | $3 \times 10^6$ | ◉ | 2.68 |
| 7 | 1,900 | E P E | 4:3:4 | 200 | E | 1,600 | 100 | 50 | 100 | 1 | 10 | $2 \times 10^6$ | ◉ | 2.84 |
| 8 | 1,900 | E P E | 4:3:4 | 200 | E | 1,600 | 100 | 50 | 100 | 1 | 20 | $6 \times 10^6$ | O | 2.84 |
| 9 | 1,900 | E P E | 4:3:4 | 200 | E | 1,600 | 100 | 50 | 100 | 1 | 50 | $8 \times 10^6$ | Δ | 2.84 |

Note:
In Table 1, PUP-OH shows polyurethanepolyol prepolymer, PUP-NCO polyurethane polyisocyanate prepolymer, P-OH polyol, E polyethylene glycol, and P polypropylene glycol. The constitution ratio is the molecular weight ratio of each segment. Also, ◉ means a ball No. of 22 or more, which shows very good sticking property, O means a ball No. of 15 to 21, which shows good sticking property, and Δ means a ball No. of 10 to 14, which means the sticking property being insufficient a little. The segment constitution is shown from the left of the structural formula.

Unless otherwise specified, all percents, ratios, etc., are by weight.

EXAMPLE 1

A polyurethanepolyol prepolymer defined by formula (I) described above, wherein the segment (AO) had the constitution shown in Table 1 below and a polyol defined by formula (IV) described above, wherein the segment (AO) had the constitution shown in Table 1 were mixed with a polyurethane polyisocyanate prepolymer defined by formula (V-2) described above (molecular weight: 1,600, segment (AO): PPG), an ionic compound (lithium perchlorate), and a catalyst (dibutyltin laurate) in the blending ratio shown in Table 1 followed by performing reaction at normal temperature to provide each test piece of ionic conductive polymeric sticking agent (Sample Nos. 1 to 9). In Sample Nos. 1 to 3, the difference in polyurethanepolyol prepolymer was observed, in Sample Nos. 4 to 6, the difference in polyol was observed, and in Sample Nos. 7 to 9, the difference in ionic compound was observed.

For each of the samples thus obtained, the volume resistivity thereof was measured by a method according to JIS K-6911, Paragraph 5-13 and also the sticking property was determined. The results obtained are shown in Table 1 below.

The segment (AO) in the polyurethane polyisocyanate prepolymer used in the example had a molecular

EXAMPLE 2

A polyurethanepolyol prepolymer defined by formula (I) described above, wherein the segment (AO) had the constitution shown in Table 2 below and a polyol defined by formula (IV) described above, wherein the segment (AO) had the constitution shown in Table 2 were mixed with a polyurethane polyisocyanate prepolymer (the same as in Example 1) and a catalyst (the same as in Example 1) at the blending ratio shown in Table 2 and the mixture was cured at room temperature to provide each of eight kinds of sheet pieces (Sample Nos. 1 to 8). In these samples, each of Sample Nos. 1 to 4 was immersed in solution I (an aqueous solution of 0.5 mol/liter of lithium perchlorate) followed by drying for several hours at 50° C. in a reduced pressure and each of Sample Nos. 5 to 8 was immersed in solution II (an ethanol solution of 0.5 mol/liter of lithium perchlorate) followed by drying for several hours at 50° C. under a reduced pressure to provide test pieces. In this case, before immersion and after drying the volume resistivity of each test piece was measured by a method according to JIS K-6911, Paragraph 5-13. The results obtained are shown in Table 2 below.

TABLE 2

| Sample No. | PUP-OH Molecular Weight | PUP-OH Segment Constitution | PUP-OH Segment Constitution Ratio | P-OH Molecular Weight | P-OH Segment Structure | PUP-NCO Molecular Weight | Blending Ratio (weight part) PUP-OH | P-OH | PUP-NCO | Catalyst | Volume Resistivity ($\Omega \cdot$ cm) After Immersion | After Adjustment | Sticking Property | (OH)/(NCO) |
|---|---|---|---|---|---|---|---|---|---|---|---|---|---|---|
| 1 | 1,900 | E P E | 4:3:4 | 600 | E | 1,600 | 100 | 25 | 75 | 0.6 | $3 \times 10^4$ | $5 \times 10^5$ | ◉ | 1.56 |
| 2 | 2,300 | E P E | 3:10:3 | 600 | E | 1,600 | 100 | 25 | 50 | 0.6 | $4 \times 10^4$ | $4 \times 10^6$ | ◉ | 2.05 |
| 3 | 2,300 | E P E | 3:10:3 | 200 | E | 1,600 | 100 | 25 | 60 | 0.6 | $4 \times 10^4$ | $6 \times 10^5$ | O | 2.82 |
| 4 | 2,300 | E P E | 3:10:3 | 250 | E | 1,600 | 100 | 20 | 45 | 0.6 | $8 \times 10^3$ | $2 \times 10^5$ | ◉ | 3.32 |
| 5 | 1,900 | E P E | 4:3:4 | 600 | E | 1,600 | 100 | 25 | 75 | 0.6 | $2 \times 10^5$ | $3 \times 10^6$ | ◉ | 1.56 |
| 6 | 2,300 | E P E | 3:10:3 | 600 | E | 1,600 | 100 | 25 | 50 | 0.6 | $7 \times 10^4$ | $4 \times 10^6$ | ◉ | 2.05 |
| 7 | 2,300 | E P E | 3:10:3 | 200 | E | 1,600 | 100 | 25 | 60 | 0.6 | $1 \times 10^5$ | $7 \times 10^5$ | O | 2.82 |
| 8 | 2,300 | E P E | 3:10:3 | 200 | E | 1,600 | 100 | 20 | 45 | 0.6 | $9 \times 10^4$ | $1 \times 10^6$ | ◉ | 3.32 |

Note:
In Table 2, PUP-OH, P-OH, PUP-NCO, P and E are defined the same as in Table 1 above and the segment constitution ratio is the molecular weight ratio of each segment. ◉, O, and Δ are also defined the same as in Table 1.

EXAMPLE 3

A polyurethanepolyol prepolymer defined by formula (I) described above, wherein the segment (AO) had a constitution shown in Table 3 below and a polyol defined by formula (IV) described above, wherein the segment (AO) had a constitution shown in Table 3 were mixed with a polyurethane polyisocyanate prepolymer (the same as in Example 1), a catalyst (the same as in Example 1) and an ionic compound (the same as in Example 1) at a blending ratio shown in Table 3 followed by reacting at room temperature to provide each of three test pieces (Sample Nos. 1 to 3). Then, the sticking performance of each of the test pieces thus obtained was tested by the method according to JIS Z 0237-1980, Paragraph 12. The results obtained are shown in Table 3 below.

TABLE 3

| | PUP-OH | | | P-OH | | PUP-NCO | Blending Ratio (weight part) | | | | | Sticking | |
|---|---|---|---|---|---|---|---|---|---|---|---|---|---|
| Sample No. | Molecular Weight | Segment Constitution | Segment Constitution Ratio | Molecular Weight | Segment Structure | Molecular Weight | PUP-OH | P-OH | PUP-NCO | Catalyst | Ionic Compound | Property Ball No. | (OH)/(NCO) |
| 1 | 1,900 | E P E | 3:4:3 | 200 | E | 1,600 | 100 | 25 | 75 | 1.3 | 10 | 24 ◉ | 2.58 |
| 2 | 1,900 | E P E | 4:3:3 | 200 | E | 1,600 | 100 | 25 | 100 | 1.3 | 10 | 20 ○ | 1.84 |
| 3 | 3,700 | P P P | 1:1:1 | 200 | E | 1,600 | 100 | 25 | 50 | 1.3 | 10 | 14 △ | 2.86 |

Note:
In Table 3, PUP-OH, P-OH, PUP-NCO, P and E are defined the same as in Table 1. The segment (AO) constitution is also defined the same as in Table 1 and the segment constitution ratio is the molecular weight ratio of each segment. The angle of the inclined plate is 30°, the measuring temperature is 21° C. and the humidity is 65%. Also, ◉, ○, and △ are defined the same as in Table 1.

EXAMPLE 4

A polyurethanepolyol prepolymer defined by formula (I) described above, wherein the segment (AO) had a constitution shown in Table 4 below was mixed with a polyurethane polyisocyanate prepolymer (the same as in Example 1), an ionic compound (the same as in Example 1), a plasticizer (dimethoxytetraethylene glycol), and a catalyst (the same as in Example 1) at a blending ratio shown in Table 4 and the mixture was cured at room temperature to provide test pieces of ionic conductive polymeric sticking agents (Sample Nos. 1 to 6). For each of the test pieces thus obtained, the volume resistivity was measured by the method according to JIS K-6911, Paragraph 5-13 and also the sticking property was determined. The results obtained are shown in Table 4.

TABLE 4

| | PUP-OH | | | PUP-NCO | Blending Ratio (weight part) | | | | | Volume Resistivity | Sticking | |
|---|---|---|---|---|---|---|---|---|---|---|---|---|
| Sample No. | Molecular Weight | Segment Constitution | Segment Constitution Ratio | Molecular Weight | PUP-OH | PUP-NCO | Catalyst | Ionic Compound | Plasticizer | (Ω·cm) | Property | (OH)/(NCO) |
| 1 | 1,600 | E P E | 1:1:1 | 1,600 | 100 | 20 | 1 | 6.3 | 30 | 5 × 10⁵ | ○ | 5.00 |
| 2 | 1,600 | E P E | 1:1:1 | 1,600 | 100 | 20 | 1 | 10.5 | 50 | 3 × 10⁵ | ◉ | 5.00 |
| 3 | 1,600 | E P E | 1:1:1 | 1,600 | 100 | 20 | 1 | 15.8 | 75 | 3 × 10⁵ | ◉ | 5.00 |
| 4 | 1,600 | E P E | 1:1:1 | 1,600 | 100 | 20 | 1 | 7.2 | 30 | 6 × 10⁵ | ○ | 5.00 |
| 5 | 1,600 | E P E | 1:1:1 | 1,600 | 100 | 20 | 1 | 9.6 | 40 | 5 × 10⁵ | ◉ | 5.00 |
| 6 | 1,600 | E P E | 1:1:1 | 1,600 | 100 | 20 | 1 | 11.9 | 30 | 7 × 10⁵ | ○ | 5.00 |

Note:
In Table 4, PUP-OH, PUP-NCO, P and E are defined the same as in Table 1. The segment (AO) constitution is also defined the same as in Table 1 and the segment constitution ratio is the molecular weight ratio of each segment. The angle of the inclined plate is 30°, the measuring temperature is 21° C. and the humidity is 65%. Also, ◉, ○, and △ are defined the same as in Table 1.

EXAMPLE 5

A polyurethanepolyol prepolymer defined by formula (I) described above, wherein the segment (AO) had a constitution shown in Table 5 below was mixed with a polyurethane polyisocyanate prepolymer (the same as in Example 1) and a catalyst (the same as in Example 1) at a blending ratio shown in Table 5 and the mixture was cured at room temperature to provide three kinds of sheet pieces (Sample Nos. 1 to 3). Each of Sample Nos. 1 to 3 thus obtained was immersed in solution I (an ethanol solution of 0.5 mol/liter of lithium perchlorate), solution II (an aqueous ethanol solution of 0.5 mol/liter of lithium perchlorate), or solution III (an aqueous solution of 0.5 mol/liter of lithium perchlorate), respectively, allowed to dry a whole day and night at normal temperature, and dried for 2 hours at 40° C. under a reduced pressure to provide test pieces. For each of the test pieces, the volume resistivity after immersion and before drying was measured by a method according to JIS K-6911, Paragraph 5-13. The results obtained are shown in Table 6.

TABLE 5

| | PUP-OH | | | PUP-NCO | Blending Ratio (weight part) | | | |
|---|---|---|---|---|---|---|---|---|
| Sample No. | Molecular Weight | Segment Constitution | Segment Constitution Ratio | Molecular Weight | PUP-OH | PUP-NCO | Catalyst | (OH)/(NCO) |
| 1 | 3,700 | P P P | 1:1:1 | 1,600 | 100 | 34 | 0.5 | 1.27 |
| 2 | 1,900 | E P E | 1:1:1 | 1,600 | 100 | 71 | 0.5 | 1.18 |
| 3 | 3,700 | E/P E/P | 1:1:1 | 1,600 | 100 | 20 | 0.5 | 2.16 |

TABLE 5-continued

| Sample No. | PUP-OH Molecular Weight | PUP-OH Segment Constitution | PUP-OH Segment Constitution Ratio | PUP-NCO Molecular Weight | Blending Ratio (weight part) PUP-OH | Blending Ratio (weight part) PUP-NCO | Blending Ratio (weight part) Catalyst | (OH)/(NCO) |
|---|---|---|---|---|---|---|---|---|
| | | E/P | | | | | | |

Note:
In Table 5, PUP-OH, PUP-NCO, P and E are defined the same as in Table 1. The segment (AO) constitution is also defined the same as in Table 1 and the segment constitution ratio is the molecular weight ratio of each segment. The angle of the inclined plate is 30°, the measuring temperature is 21° C. and the humidity is 65%. E/P: copolymer of polyethylene glycol and polypropylene glycol

TABLE 6

| Sample No. | Solution I After Immersion | Solution I After Drying | Solution II After Immersion | Solution II After Drying | Solution III After Immersion | Solution III After Drying |
|---|---|---|---|---|---|---|
| 1-a | $4 \times 10^4$ | $4 \times 10^6$ | $1 \times 10^4$ | $9 \times 10^6$ | $1 \times 10^4$ | $2 \times 10^7$ |
| 1-b | $4 \times 10^4$ | $2 \times 10^6$ | $1 \times 10^4$ | $2 \times 10^6$ | $1 \times 10^4$ | $2 \times 10^7$ |
| 1-c | $4 \times 10^4$ | $7 \times 10^5$ | $1 \times 10^4$ | $9 \times 10^5$ | $1 \times 10^4$ | $1 \times 10^7$ |
| 1-d | $4 \times 10^4$ | $8 \times 10^4$ | $2 \times 10^4$ | $2 \times 10^5$ | $1 \times 10^4$ | $6 \times 10^6$ |
| 2-a | $4 \times 10^4$ | $2 \times 10^7$ | $1 \times 10^4$ | $1 \times 10^7$ | $1 \times 10^4$ | $2 \times 10^7$ |
| 2-b | $4 \times 10^4$ | $8 \times 10^6$ | $8 \times 10^3$ | $1 \times 10^6$ | $7 \times 10^3$ | $2 \times 10^7$ |
| 2-c | $4 \times 10^4$ | $3 \times 10^6$ | $2 \times 10^4$ | $6 \times 10^5$ | $8 \times 10^3$ | $1 \times 10^7$ |
| 2-d | $4 \times 10^4$ | $2 \times 10^5$ | $1 \times 10^4$ | $4 \times 10^5$ | $8 \times 10^3$ | $7 \times 10^6$ |
| 3-a | $5 \times 10^4$ | $1 \times 10^7$ | $1 \times 10^4$ | $1 \times 10^7$ | $1 \times 10^4$ | $8 \times 10^6$ |
| 3-b | $5 \times 10^4$ | $1 \times 10^7$ | $1 \times 10^4$ | $7 \times 10^6$ | $1 \times 10^4$ | $8 \times 10^6$ |
| 3-c | $5 \times 10^4$ | $4 \times 10^5$ | $1 \times 10^4$ | $2 \times 10^5$ | $1 \times 10^4$ | $4 \times 10^6$ |
| 3-d | $6 \times 10^4$ | $1 \times 10^5$ | $1 \times 10^4$ | $2 \times 10^5$ | $1 \times 10^4$ | $4 \times 10^5$ |

Note:
In Table 6, the addition of the letter a, b, c or d to the number shows the state of the plasticizer; that is, a: no plasticizer, b: 5 parts by weight of plasticizer, c: 10 parts by weight of plasticizer, and d: 20 parts by weight of plasticizer.

EXAMPLE 6

A polyol of the block copolymer defined in formula (IV) described above, wherein the segment (AO) had a constitution shown in Table 7 below was mixed with a polyurethane polyisocyanate prepolymer (molecular weight: 2,600, Segment (AO): PPG) defined by formula (VI) described above and a catalyst (the same as in Example 1) at a blending ratio shown in Table 7 below and the mixture was cured at room temperature to provide a sheet piece. The sheet piece thus obtained was immersed in solution I (a methanol solution of 0.5 mol/liter of lithium chloride), solution II (a methanol solution of 0.5 mol/liter of sodium thiocyanate), or solution III (a methanol solution of 0.5 mol/liter of lithium borofluoride), the sheet piece was then allowed to dry a whole day and night at normal temperature, and dried for 4 hours at 50° C. under reduced pressure to provide three test samples (Sample Nos. 1 to 3).

For each of the test pieces thus obtained, the volume resistivity before immersion and after drying was measured by a method according to JIS K-6911, Paragraph 5-13 and the sticking viscosity after drying was measured by a method according to JIS Z-0237-1980, Paragraph 12.

The results obtained are shown in Table 8 below.

In addition, the whole molecular weight of the segment (AO) in the polyurethane isocyanate prepolymer was 2,000.

TABLE 7

| P-OH Molecular Weight | P-OH Segment Constitution | P-OH Sogment Constitution Ratio | PUP-NCO Molecular Weight | Blending Ratio (weight part) P-OH | Blending Ratio (weight part) PUP-NCO | Blending Ratio (weight part) Catalyst | (OH)/(NCO) |
|---|---|---|---|---|---|---|---|
| 2,000 | E P E | 1:2:1 | 2,600 | 100 | 67 | 0.5 | 1.29 |

Note:
In Table 7, P-OH, PUP-NCO, P and E are defined the same as in Table 1, and each segment in P-OH is bonded by an ether bond.

TABLE 8

| Sample No. | Volume Resistivity (Ω · cm) After Immersion | Volume Resistivity (Ω · cm) After Drying | Sticking Property (after drying) Ball No. | |
|---|---|---|---|---|
| 1 (immersion in solution I) | $9 \times 10^5$ | $4 \times 10^6$ | 22 | ◉ |
| 2 (immersion in solution II) | $1 \times 10^5$ | $7 \times 10^5$ | 11 | Δ |
| 3 (immersion in solution III) | $8 \times 10^3$ | $2 \times 10^5$ | 21 | ○ |

Note:
In Table 8, ◉, ○, Δ are defined the same as in Table 1 above.

The ionic conductive sticking agents in Examples 1 to 6 described above did not show the formation of cracking, the growth of fungi, vanishing of transparency, the loss of sticking property, the reduction of electric conductivity, etc., for a long period of time.

When a plasticizer, etc., is used for obtaining softness, a living body adaptability such as skin irritation, etc., must be sufficiently considered but since the polyol for use in this invention is composed of alkylene oxide chains, the sticking agent containing a plasticizer shows high safety and is excellent for living body adaptability.

As compared to that of a conventional ionic conductive sticking agent composed of natural polysaccharide (e.g., karaya gum) for a living body electrode which has a specific volume resistivity of $10^4$ to $10^7 \Omega \cdot cm$ and has such faults of causing dispersion in quality, changing the performance by the influence of water, easily growing fungi, and causing discoloring, the ionic conductive sticking agent of this invention is far excellent as described above. That is, the sticking agent of this invention shows an electric conduction capable of sufficiently meeting the requirements as living body electrodes, has good sticking property, gives good results in the measurement of electrocardiograms, and shows no change with the passage of time, which solve the problems in conventional techniques.

While the invention has been described in detail and with reference to specific embodiments thereof, it will be apparent to one skilled in the art that various changes and modifications can be made therein without departing from the spirit and scope thereof.

What is claimed is:

1. An ionic conductive polymeric sticking agent comprising:
   (a) a reaction product of:
     (i) a polyurethanepolyol prepolymer having an alkylene oxide chain, wherein the molecular weight of the polyurethanepolyol prepolymer is from 1,400 to 10,000, a polyol having an alkylene oxide chain, wherein the molecular weight of the polyol is from 150 to 6,000, or mixtures thereof; and
     (ii) a polyurethane polyisocyanate prepolymer having an alkylene oxide chain, and
   (b) an ionic compound, wherein the ionic compound is an alkali metal salt.

2. The sticking agent as claimed in claim 1, wherein the polyurethanepolyol prepolymer is represented by the following formulae (I):

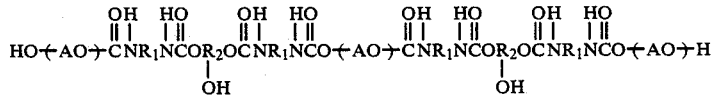

wherein $R_1$ and $R_2$ each represents an alkyl group, an alicyclic group, or an aromatic group and (AO) represents an alkylene oxide chain.

3. The sticking agent as claimed in claim 1, wherein the polyol is represented by the following formulae (II) to (IV):

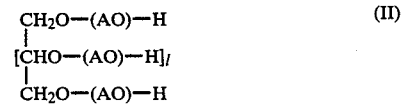

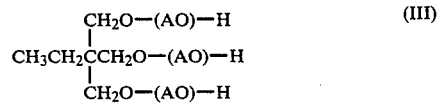

$$R_3O-(AO)-H \quad \text{(IV)}$$

wherein (AO) represents an alkylene oxide chain; $R_3$ represents a hydrogen atom, an alkyl group, an alicyclic group or an aromatic group; and l represents an integer of 1 or 4.

4. The sticking agent as claimed in claim 1, wherein the polyurethane polyisocyanate prepolymer is represented by the following formulae (V-1) to (VIII):

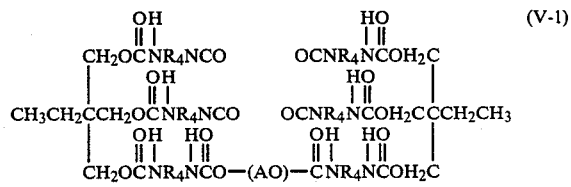

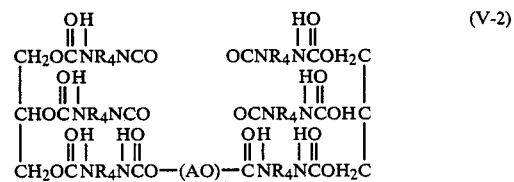

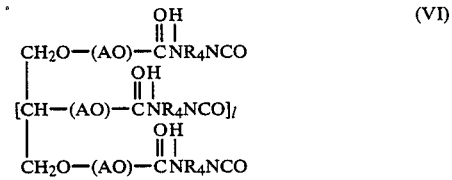

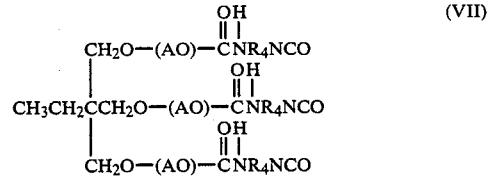

wherein $R_4$ represents an alkyl group, an alicyclic group or an aromatic group; (AO) represents an alkylene oxide chain, and l represents an integer of 1 or 4.

5. The sticking agent as claimed in claim 1, wherein the alkylene oxide chain is polymethylene glycol, polyethylene glycol, polypropylene glycol, polytetramethylene glycol, polypentamethylene glycol, polyhexamethylene glycol, polyheptamethylene glycol or copolymers thereof.

6. The sticking agent as claimed in claim 4, wherein the molecular weight of the polyurethane polyisocyanate prepolymer is from 500 to 10,000.

7. The sticking agent as claimed in claim 1, wherein the ionic compound is lithium perchlorate.

8. The sticking agent as claimed in claim 1, wherein the sticking agent further contains a plasticizer.

* * * * *